United States Patent Office 3,425,753
Patented Feb. 4, 1969

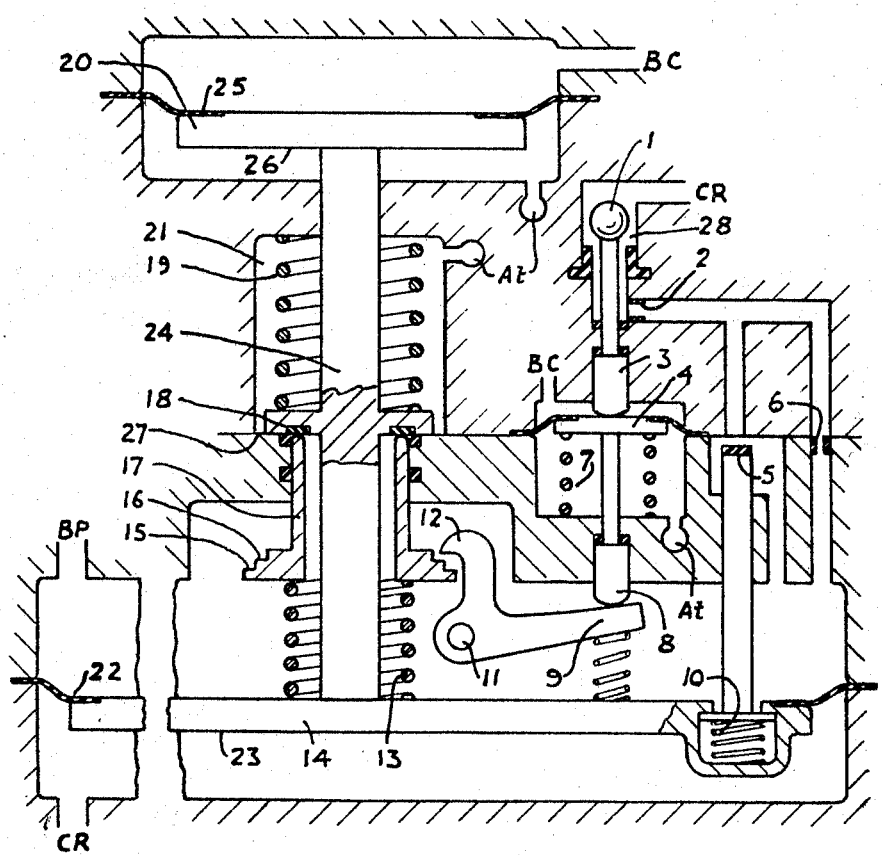

3,425,753
BRAKE DISTRIBUTOR APPARATUS
Arthur W. Simmons and Jack Washbourn, London, England, asignors to Westinghouse Brake and Signal Company, Limited, London, England
Filed Nov. 2, 1965, Ser. No. 506,076
U.S. Cl. 303—36      4 Claims
Int. Cl. B60t 15/52

ABSTRACT OF THE DISCLOSURE

A distributor for a fluid operated braking apparatus including a quick service valve and a mechanism for controlling the availability thereof, and a control reservoir charging valve arranged to be closed upon a brake application and reopened at some late stage of brake release. An actuating device controls the said mechanism to control the availability of the quick service valve substantially simultaneously with the opening and closing of the control reservoir charging valve.

---

This invention relates to distributors for fluid pressure operable braking apparatus, such as that for use with trains of railway vehicles.

With such distributors of the graduated release kind it is usual to provide a quick service valve for locally connecting the brake pipe to a bulb capacity in order to obtain rapid serial operation of the distributors down a train of vehicles.

Each distributor generally comprises a main pile having two diaphragms coupled to each other and acting in opposition to control the connection of an auxiliary reservoir to a brake cylinder and the latter to atmosphere, one diaphragm being subject to the difference between brake pipe pressure and control reservoir pressure, and the other diaphragm being subject to brake cylinder pressure and atmosphere.

A distributor also usually comprises a control reservoir charging valve which is arranged to be closed upon a brake application taking place, and re-opened at some late stage of release.

During a brake application and re-application the control reservoir charging valve closure and opening have to be arranged so that there is a minimum loss of control reservoir pressure into the brake pipe.

Accordingly, the present invention provides a distributor for fluid pressure operable braking apparatus comprising a control reservoir charging valve, a quick service valve and actuator means for controlling the quick service availability substantially simultaneously with the opening and closing of the control reservoir charging valve.

The actuator means may comprise a biassed diaphragm subject on one side to brake cylinder pressure and on the other side to atmosphere, the diaphragm being arranged to control stem means for determining quick service availability and further means for determining the opening and closing of a control reservoir charging valve member substantially simultaneously.

The stem means may be adapted to actuate latch means for controlling the position of a seat member of a quick service valve.

The invention will now be described, by way of example, with reference to the accompanying drawing which illustrates, in cross-section, a quick service valve for a graduated release distributor having latch means for controlling the seat member of the quick service valve in two positions.

The distributor has a main pile comprising a main diaphragm 14 mounted such as to be subject on its upper side 22 to brake pipe pressure BP and on its lower side 23 to control reservoir pressure CR. The main diaphragm 14 is coupled by a stem 24 to a further diaphragm 20 subject on its upper side 25 to brake cylinder pressure BC and on it lower side 26 to atmosphere At. The pile is arranged to control an inlet and exhaust valve arrangement which, however, does not form part of the present invention and has been omitted for the sake of simplicity of illustration.

The stem 24 carries a quick service valve member 18 enagageable with a seat sleeve member 17 which is biassed by spring means 13 and reciprocably and sealingly mounted in a bore concentric with the stem 24. The seat member 17 is provided with two steps or shoulders 15, 16, engageable by one end or nose 12 of bell crank latch means 9 pivotally mounted at 11 and controlled by a diaphragm 4 subject to brake cylinder pressure and atmosphere. As illustrated in the drawing, the first step 16, when engaged by the end or nose 12 of the latch 9, corresponds to the position of substantially full brake release and the second step 15 to the position of partial release.

In the brake release position, spring 19 holds the distributor pile in the position illustrated where the quick service valve member 18 comes against stop 27 in bulb 21 and the seat sleeve member 17 is held against the valve member 18 by its biassing spring 13, thus isolating the brake pipe chamber adjacent side 22 of diaphragm 14 from the bulb 21. The nose 12 of the latch means 9 rests against the side of the upper step 16 on the seat sleeve member 17 but is moved out of engagement by stem 8 being acted upon by diaphragm 4 which diaphragm is subject to brake cylinder pressure on its upper side and to atmosphere and the force of a spring 7 in a chamber on its underside.

In the embodiment illustrated, the diaphragm 4 also controls a stem 3 which determines the position of a control reservoir charging valve 1 in passage 28 forming a connection between the control reservoir and the brake pipe, which connection is also controlled by a restrictor valve 5 loaded by a spring 10 housed in the main diaphragm 14.

In an alternative arrangement, not illustrated, the control reservoir charging valve 1 may be controlled by relay means.

In the brake release position, as illustrated, the restrictor valve 5 is open and the fluid flow between brake pipe and control reservoir is principally via a choke 2, which is the sensitivity choke, but when the restrictor valve is closed the fluid flow can only take place via a choke 6 which is of a predetermined small capacity relatively to that of the choke 2.

It is necessary to have choke 2 effective when the pile is in the release position and not the relatively very small choke 6, because with the brake in the release position shown there must be a reasonable degree of stability of the valve. Small fluctuations in brake pipe pressure must not cause the brake to apply inadvertently, and for practical reasons the larger choke 2 must be used to ensure against this happening.

During the release of a distributor it is important to ensure that when the control reservoir charging valve 1 is opened and the connection between the brake pipe BP and the control reservoir CR is reestablished through the sensitivity choke, if a reapplication is made, excessive loss of control reservoir pressure will not take place. This can be assured, as in the embodiment shown for example, if the restrictor valve is closed and choke 6 only is effective, but if the pile is sufficiently near release position so that it is open, then it is arranged for the diaphragm 4 to also allow the latch 12 to engage either with step 15 or step 16.

This ensures that quick service valve seat sleeve member 17 is prevented from moving should the pile move up due to a re-application of the brakes. Thus quick service will ensue.

It will also be appreciated that during an initial brake application, the quick service operation causes the brake pipe to deplete and this causes the brake cylinder pressure to increase. As soon as the value of the pressure is sufficient to overcome the spring 7, the latch 12 disengages from the sleeve member 17 and the quick service valve closes. There may, therefore, be no further build-up of brake cylinder pressure but at the same time the control reservoir charging valve 1 will have closed so that there will be no loss of control reservoir pressure into the brake pipe, either through the choke 2 or the choke 6.

Having thus described our invention what we claim is:

1. A distributor for fluid pressure operable braking apparatus comprising a control reservoir charging valve, a quick service valve, a selector means for selecting the availability of the quick service valve, and an actuator means for controlling the selector means to control the quick service availabality substantially simultaneously with the opening and closing of the control reservoir charging valve.

2. A distributor as claimed in claim 1, in which the actuator means comprise a biassed diaphragm subject on one side to brake cylinder pressure and on the other side to atmosphere, the diaphragm being arranged to control stem means for determining quick service availability and further means for determining the opening and closing of a control reservoir charging valve member substantially simultaneously.

3. A distributor as claimed in claim 2, in which the stem means are adapted to actuate latch means for controlling the position of a seat member of a quick service valve.

4. A distributor as claimed in claim 2, in which the control reservoir charging valve member is controllable by a stem slidingly mounted for engagement with the diaphragm.

References Cited

UNITED STATES PATENTS 3,361,486  1/1968  Simmons et al. _____ 303—36

TRYGVE M. BLIX, *Primary Examiner.*